(12) United States Patent
Nguyen et al.

(10) Patent No.: US 10,899,958 B2
(45) Date of Patent: Jan. 26, 2021

(54) LIQUID GAS TREATMENT FLUIDS FOR USE IN SUBTERRANEAN FORMATION OPERATIONS

(71) Applicant: Halliburton Energy Services, Inc., Houston, TX (US)

(72) Inventors: Philip D. Nguyen, Houston, TX (US); Matthew Lewis Lahman, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 108 days.

(21) Appl. No.: 16/316,587

(22) PCT Filed: Jul. 22, 2016

(86) PCT No.: PCT/US2016/043477
§ 371 (c)(1),
(2) Date: Jan. 9, 2019

(87) PCT Pub. No.: WO2018/017110
PCT Pub. Date: Jan. 25, 2018

(65) Prior Publication Data
US 2019/0300781 A1    Oct. 3, 2019

(51) Int. Cl.
*C09K 8/80* (2006.01)
*C09K 8/68* (2006.01)
(Continued)

(52) U.S. Cl.
CPC .................. *C09K 8/80* (2013.01); *C09K 8/62* (2013.01); *C09K 8/685* (2013.01); *C09K 8/703* (2013.01);
(Continued)

(58) Field of Classification Search
CPC . C09K 8/80; C09K 8/62; C09K 8/685; C09K 8/703; C09K 8/82; C09K 2208/10; E21B 43/267
See application file for complete search history.

(56) References Cited

U.S. PATENT DOCUMENTS

| 4,554,082 A | 11/1985 | Holtmyer et al. |
| 4,627,495 A | 12/1986 | Harris et al. |

(Continued)

FOREIGN PATENT DOCUMENTS

| CA | 2186806 | 4/1997 |
| WO | 2015018028 A1 | 2/2015 |

(Continued)

OTHER PUBLICATIONS

Ishida et al., "Influence of Fluid Viscosity on the Hydraulic Fracturing Mechanism," Journal of Energy Resources Technology, Transactions of the ASME, vol. 125, Sep. 2004, Copyright (c) 2004 by ASME, 11 pages.

(Continued)

*Primary Examiner* — Crystal J Miller
(74) *Attorney, Agent, or Firm* — McGuireWoods LLP (57) ABSTRACT

The embodiments of the present disclosure relate to increasing fracture network complexity within a subterranean formation using a plurality of fluid stages where one or more of such fluid stages utilizes a liquid gas treatment fluid. The embodiments described herein allow creation or extension of a dominant fracture and branch fractures extending therefrom at one or both of the near-wellbore region and/or the far-field region of a fracture network, thereby enhancing fracture network complexity.

20 Claims, 3 Drawing Sheets

(51) Int. Cl.
    C09K 8/70      (2006.01)
    C09K 8/82      (2006.01)
    E21B 43/267    (2006.01)
    C09K 8/62      (2006.01)

(52) U.S. Cl.
    CPC .............. *C09K 8/82* (2013.01); *E21B 43/267* (2013.01); *C09K 2208/10* (2013.01)

(56) References Cited

U.S. PATENT DOCUMENTS

| | | | |
|---|---|---|---|
| 6,509,300 | B1 | 1/2003 | Gupta |
| 7,036,597 | B2 | 5/2006 | O'Brien et al. |
| 8,607,870 | B2 | 12/2013 | Gu et al. |
| 8,613,314 | B2 | 12/2013 | Garcia-Lopez De Victoria et al. |
| 8,733,439 | B1 | 5/2014 | Bakshi |
| 2008/0032898 | A1* | 2/2008 | Brannon ............... E21B 43/267 507/100 |
| 2013/0284437 | A1* | 10/2013 | Nguyen ............... E21B 43/267 166/280.1 |
| 2014/0060826 | A1* | 3/2014 | Nguyen ............... E21B 43/267 166/280.1 |
| 2014/0246198 | A1 | 9/2014 | Pandya et al. |
| 2014/0246199 | A1 | 9/2014 | Gupta et al. |
| 2014/0251626 | A1* | 9/2014 | Gomaa ..................... C09K 8/70 166/308.5 |
| 2014/0262291 | A1 | 9/2014 | Chen et al. |
| 2014/0299318 | A1 | 10/2014 | Crews et al. |
| 2014/0299326 | A1 | 10/2014 | Crews |
| 2014/0378354 | A1 | 12/2014 | Kelly et al. |
| 2015/0345268 | A1* | 12/2015 | Bryant ..................... C09K 8/58 166/271 |

FOREIGN PATENT DOCUMENTS

| | | |
|---|---|---|
| WO | 2015069817 A1 | 5/2015 |
| WO | 2016016444 A1 | 2/2016 |
| WO | 2017052522 A1 | 3/2017 |
| WO | 2017052524 A1 | 3/2017 |
| WO | 2017052525 A1 | 3/2017 |
| WO | 2017052527 A1 | 3/2017 |
| WO | 2017052529 A1 | 3/2017 |

OTHER PUBLICATIONS

Stanchits, et al,"Monitoring the Early Onset of Hydraulic Fracture Initiation by Acoustic Emission and Volumetric Deformation Measurements," American Rock Mechanics Association, ARMA 13-664, 47th US Rock Mechaincs / Geomachics Symposium held in San Francisco, CA, USA Jun. 23-26, 2013, 9 pages.
Soliman, et al. "Fracturing Design Aimed at Enhancing Fracture Complexity," Society of Petroleum Engineers, Copyright 2010, SPE 130043, SPE EUROPEC/EAGE Annual Conference and Exhibition held in Barcelona, Spain, Jun. 14-17, 2010.
Ingram, et al."Methods Improve Stimulation Efficiency of Perforation Clusters in Completions," Journal of Petroleum Technology, Copyright 2003-2016, obtained from http://www.spe.org/jpt/article/6059-technology-update-2-4/, 22 pages.
Pei, P., at al., "Shale gas reservoir treatment by a CO2-based technology," Journal of Natural Gas Science and Engineering (2015), http://dx.doi.org/10.1016/j.jngse.2015.03.026, 12 pages.
Zoback et al., Laboratory Hydraulic Fracturing Experiments in Intact and Prefractured Rock, Int. J. Rock Mech. Min Sci. & Geomech. Abstr. vol. 14, pp. 49-58, Pergamon Press 1977, 10 pages.
Palisch, et al., "Slickwater Fracturing—Food for Thought," Copyright 2010, SPE Annual Technical Conference and Exhibition held in Denver, Colorado, USA; Sep. 21-24, 2008, Society of Petroleum Engineers, SPE115765, 20 pages.
Ribeiro, et al., "Use of a CO2-Hybrid Fracturing Design to Enhance Production from Unpropped Fracture Networks," Copyright 2015, Society of Petroleum Engineers, SPE-173380-MS, SPE Hydraulic Fracturing Technology Conference held in The Woodlands, Texas, USA, Feb. 3-5, 2015, 18 pages.
Economides, et al., "Reservoir Stimulation," Copyright 2000, 43 pages.
Patent Cooperation Treaty, International Search Report and Written Opinion, PCT Appln. No. PCT/US2016/043477, dated Apr. 14, 2017.

* cited by examiner

LIQUID GAS TREATMENT FLUIDS FOR USE IN SUBTERRANEAN FORMATION OPERATIONS

BACKGROUND

The embodiments herein relate generally to subterranean formation operations and, more particularly, to liquid gas treatment fluids for use in subterranean formation operations.

Hydrocarbon producing wells (e.g., oil producing wells, gas producing wells, and the like) are often stimulated by hydraulic fracturing treatments. In traditional hydraulic fracturing treatments (or simply "fracturing"), a treatment fluid, sometimes called a carrier fluid in cases where the treatment fluid carries particulates entrained therein, is pumped into a portion of a subterranean formation (which may also be referred to herein simply as a "formation"). The treatment fluid is pumped at a rate and pressure sufficient to break down the formation and create one or more fractures therein. As used herein, the term "formation" encompasses the term "reservoir," referring to a portion of the formation which has sufficient porosity and permeability to store and transmit fluids (e.g., hydrocarbons). As used herein, the term "treatment fluid" refers generally to any fluid that may be used in a subterranean application in conjunction with a desired function and/or for a desired purpose. The term "treatment fluid" does not imply any particular action by the fluid or any component thereof.

Typically, particulate solids are suspended in a portion of the treatment fluid and then deposited into the fractures. The particulate solids, known as "proppant particulates" or simply "proppant" serve to prevent the fractures from fully closing once the hydraulic pressure is removed. By keeping the fractures from fully closing, the proppant particulates form a proppant pack having interstitial spaces that act as conductive paths through which fluids produced from the formation may flow. As used herein, the term "proppant pack" refers to a collection of proppant particulates in a fracture, thereby forming a "propped fracture." The degree of success of a stimulation operation depends, at least in part, upon the ability of the proppant pack to permit the flow of fluids through the interconnected interstitial spaces between proppant particulates while maintaining open the fracture.

The complexity of a fracture network (or "network complexity") may be enhanced by stimulation operations to create new or enhance (e.g., elongate or widen) existing fractures, which may be interconnected. As used herein, the term "fracture network" refers to the access conduits, either natural or man-made or otherwise, within a subterranean formation that are in fluid communication with a wellbore. The "complexity" of a fracture network refers to the amount of access conduits, man-made or otherwise, within a subterranean formation that are in fluid communication with a wellbore; the greater the amount of access conduits, the greater the complexity. A fracture network with enhanced complexity may increase the amount of produced fluids that may be recovered from a particular subterranean formation.

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The embodiments herein relate generally to subterranean formation operations and, more particularly, to liquid gas treatment fluids for use in subterranean formation operations.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

The use of directional terms such as above, below, upper, lower, upward, downward, left, right, uphole, downhole and the like are used in relation to the illustrative embodiments as they are depicted in the figures herein, the upward direction being toward the top of the corresponding figure and the downward direction being toward the bottom of the corresponding figure, the uphole direction being toward the surface of the well and the downhole direction being toward the toe of the well. Additionally, the embodiments depicted in the figures herein are not necessarily to scale and certain features are shown in schematic form only or are exaggerated or minimized in scale in the interest of clarity.

The embodiments of the present disclosure relate to increasing fracture network complexity within a subterranean formation using a plurality of fluid stages where one or more of such fluid stages utilizes a liquid gas treatment fluid. As used herein, the term "liquid gas," and grammatical variants thereof (e.g., "liquid gas fluid), refers to a gas that has been turned into a liquid by cooling or compressing the gas. The liquid gas may be introduced into a subterranean formation below its bubble point. Advantages of the embodiments described herein include improved stimulated fracture coverage by increasing both the number of stimulated fractures and their density (i.e., the number of fractures per unit volume of the subterranean formation); mitigation of clay-swelling effects in water-sensitive, clay-laden subterranean formation types (e.g., shale); improved clean-up during flowback; and decreased risk of increasing the water cut (i.e., the ratio of water produced compared to the volume of total liquids produced) in nearby producing wellbores. Further, the embodiments described herein allow creation or extension of a dominant fracture and branch fractures extending therefrom at one or both of the near-wellbore region and/or the far-field region of a fracture network, thereby enhancing fracture network complexity.

As used herein, the term "dominant fracture," and grammatical variants thereof, refers to a primary fracture extending from a wellbore. As used herein and with the embodiments of the present disclosure, the wellbore may be vertical, horizontal, or deviated (neither vertical, nor horizontal), without departing from the scope of the present disclosure. In some embodiments, the dominant fracture(s) described herein may have a length of greater than about 3 meters ("m"). As a specific example, in some instances, the dominant fracture(s) have a length in the range of about 3 m to about 300 m, encompassing any value and subset therebetween.

A "branch fracture," and grammatical variants thereof, as used herein, refers to any fracture extending from a dominant fracture or extending from any non-dominant fracture (e.g., a secondary branch fracture, a tertiary branch fracture, and the like). Accordingly, a non-primary fracture that itself extends from a branch fracture is encompassed in the term "branch fracture." As used herein, a secondary branch fracture is a branch fracture extending from a dominant fracture; a tertiary branch fracture is a branch fracture that extends from a secondary branch fracture. A branch fracture may be formed by hydraulic mechanisms or shear mechanisms (e.g., sliding of bedding planes, shifting of formation portions, stress relief, and the like). In some embodiments, the branch fracture(s) described herein may have a length of less than about 50 meters ("m"). As a specific example, in some instances, the branch fracture(s) have a length in the range of about 0.03 m to about 50 m, encompassing any value and subset therebetween.

The dominant fractures and branch fractures described herein may be of any shape and may be formed by an ablation of any form that allows fluids to flow from the subterranean formation and into a wellbore, consistent with the descriptions provided herein. Typically branch fractures extend orthogonally from the originating dominant or non-dominant fracture, and may be in the form of cracks, slots, conduits, perforations, holes, or any other ablation within the formation. Branch fractures, regardless of the type of fracture from which they originate, have a flow channel width or flow opening size of less than that of the dominant fracture or non-dominant fracture from which it extends. In some instances, the branch fracture can be considered a microfracture due to its flow channel width or flow opening size. Branch fractures that are considered microfractures may have a flow channel width or flow opening size of from about 1 μm to about 100 μm, encompassing any value and subset therebetween.

The length and flow channel width of the dominant and branch fracture(s) described herein depend on a number of factors including, but not limited to, the type of subterranean formation being stimulated, the pressure (e.g., pump pressure) at which the treatment fluids are introduced, the type and content of the particular treatment fluids, the type of subterranean formation operation being performed, and the like, and any combination thereof.

As used herein, the term "fracture" refers collectively to dominant fractures and branch fractures, unless otherwise specified.

As used herein, the term "near-wellbore region," and grammatical variants thereof (e.g., "near-wellbore," and the like), refers to an annular volume of a subterranean formation penetrated by wellbore from the outer diameter of the wellbore extending radially inward along a dominant fracture from the wellbore and into the formation a distance of no greater than about 10 meters (33 feet). As used herein, the term "far-field region," and grammatical variants thereof (e.g., "far-field," and the like), refers to an annular volume of a subterranean formation penetrated by wellbore from the outer diameter of the wellbore extending radially inward along a dominant fracture beyond the near-wellbore region, or along a branch fracture. In some instances, the far-field region may be beyond the dominant fracture tip into the subterranean formation, the dominant fracture tip the portion of the dominant fracture that permits growth of the dominant fracture.

The use of the plurality of fluids described herein, including at least one liquid gas fluid, further allows at least partial separation of the formation of the dominant fracture and the formation of one or more branch fractures, such that the dominant fracture can continue to grow in length as branch fractures are created or extended therefrom. That is, the dominant fracture growth is not stunted due to leakoff in the non-length direction. As used herein, the term "leakoff" refers to the tendency of fluid to be forced into a formation (e.g., due to a magnitude of pressure exerted on the formation such as during fluid introduction). Additionally, stress shadowing reduces the width of the dominant fracture, further encouraging growth thereof in length.

Multistage fracturing may also be utilized with the embodiments of the present disclosure to further enhance fracture complexity, and thus the amount of hydrocarbons produced therefrom. As used herein, the term "multistage fracturing treatments," and grammatical variants thereof (e.g., "multistage fracturing," "multistage fracturing operations," and the like), refers to a subterranean formation operation in which a plurality of reservoir intervals, or a plurality of locations within one or more reservoir intervals, in the subterranean formation are stimulated in succession, including dominant and branch fractures. Examples of multistage fracturing treatments may include, but are not limited to, plug-and-perf operations, dissolvable plug-and-perf operations, continuous stimulation operations, and the like, and any combination thereof. For example, in some multistage fracturing treatments, a first fracture may be formed at a reservoir interval (e.g., through an opening), followed by at least a second fracture formed at the same or a different reservoir (e.g., through the same or different opening) interval in a subterranean formation. In some instances, multistage fracturing may involve fracturing a section of a reservoir interval, followed by plugging the fracture such that a treatment fluid may be diverted to a different location in the same reservoir interval or a different reservoir interval for forming a second fracture. The second fracture may then be plugged and the process repeated until the desired number of fractures are formed.

Accordingly, the embodiments of the present disclosure further permit creation of multiple dominant fractures within a single set of openings, which can further have branch fractures that may or may not interconnect in the near-wellbore or far-field regions to further enhance fracture network complexity. The term "opening" refers to any orifice or gap extending into a subterranean formation from a wellbore and may include, but is not limited to, a natural opening, an opening caused by a perforation charge of any size or shape, an opening caused by a group of perforation charges, an opening caused by a jetting fluid and/or particulate penetration from a jetting tool (e.g., a hydraulic jetting tool, or hydrajetting tool), an opening caused by a jetting fluid and/or particulate penetration from a ball drop sliding or mechanically shifting sleeve port, an opening caused by a jetting fluid and/or particulate penetration from a restricted ball drop sliding or mechanically shifting sleeve port, and the like, and any combination thereof. An "opening" encompasses a single opening and any cluster of openings (e.g., any single perforation and/or slot, and any clusters of perforations and/or slots), unless otherwise specified, and may be made in a wellbore itself, or through casing or liner, which may or may not be cemented.

Other subterranean formation operations that may utilize the embodiments described herein may include, but are not limited to, re-fracturing operations (e.g., to add newly optimized perforated zones and initiate dominant fracture geometry), remedial treatments, completion operations, and the like, without departing from the scope of the present disclosure.

As mentioned above, increasing fracture complexity in subterranean formations may increase the conductivity and productivity of the formation. Increasing fracture network complexity (e.g., keeping fractures, such as dominant fractures and branch fractures as described below, opened) greatly increases the surface area for the hydrocarbons (gas and/or oil) to desorb from the formation matrix, providing flow paths for these fluids to communicate with connected fractures and the wellbore for recovery.

In some embodiments, the complex fracture network enhancement methods and systems described herein may be utilized in unconventional subterranean formations or in low-permeability subterranean formations, such as shale formations, tight-gas formations, and the like. As used herein, the terms "subterranean formations" or "formations" collectively refer to both conventional and low-permeability formations, unless otherwise specified. The permeability of a formation is a measure of the formation's resistance to through-flow fluid. Thus, low-permeability formations require considerable applied pressure in order to flow fluid through its pore spaces, as compared to formations having higher permeabilities. As used herein, the term "low-permeability formation," and grammatical variants thereof, refers to a formation that has a matrix permeability of less than 1,000 microdarcy (equivalent to 1 millidarcy). As used herein, the term "low-permeability formation" encompasses "ultra-low permeability formations," and grammatical variants thereof, which refers to a formation that has a matrix permeability of less than 1 microdarcy (equivalent to 0.001 millidarcy).

Examples of such low-permeability formations may include, but are not limited to, shale reservoirs and tight-gas sands. Shale reservoirs are sources of hydrocarbons comprising complex, heterogeneous rock with low permeability. Shale reservoirs may have permeabilities as low as less than about 0.001 millidarcy ("mD") ($9.869233 \times 10^{-19}$ m$^2$), and even as low as less than about 0.0001 mD ($9.869233 \times 10^{-20}$ m$^2$). An example of such a shale reservoir is the Eagle Ford Formation in South Texas, U.S.A., also having complex horizontal bedding planes representative of many shale reservoirs. Tight-gas sands are low permeability formations that produce mainly dry natural gas and may include tight-gas carbonates, tight-gas shales, coal-bed methane, tight sandstones, and the like. Tight-gas sands may have permeabilities as low as less than about 1 mD ($9.869233 \times 10^{-16}$ m$^2$), and even as low as less than about 0.01 mD ($9.869233 \times 10^{-18}$ m$^2$).

In some embodiments described herein, a plurality of fluid types are utilized, particularly with reference to viscosity, efficiency (i.e., a measure of leakoff propensity), and particulate content, to enhance fracture network complexity, which may additionally be used in formations having complex bedding planes, such as shale formations. High efficiency treatment fluids are used in the embodiments herein to induce one or more dominant fractures in the maximum stress direction of a formation, even if pre-existing fractures crossing the maximum stress direction exist. As used herein, the term "high efficiency treatment fluid," and grammatical variants thereof, refers to a fluid having a viscosity greater than 6 centipoise (cP) and a leakoff propensity of less than about 30% by volume of the liquid portion of the high efficiency treatment fluid. In some embodiments, the high efficiency treatment fluid may have a viscosity in the range of greater than 6 centipoise (cP) to about 5000 cP, encompassing any value and subset therebetween. In some particular embodiments, the high efficiency treatment fluid may have a viscosity in the range of 100 cP to 3000 cP, or 100 cP to 2000 cP, encompassing any value and subset therebetween. As used herein, the term "leakoff propensity" refers to the volume loss of a fluid portion of a treatment fluid due to being forced into a formation during the duration of a particular subterranean formation operation.

The high efficiency treatment fluids described herein generate thick, wide, and planar dominant fractures with few branch fractures extending therefrom because of their innate low leakoff propensity, whereas ultra-low viscosity fluids comprising liquid gas are used to generate narrower, wave-like branch fractures extending (e.g., orthogonally) from the dominant fractures. As used herein, the term "ultra-low viscosity fluid," and grammatical variants thereof, refers to a fluid having a viscosity of less than 1 cP, including and encompassing 0.1 cP and any value or subset therebetween. Because the high efficiency treatment fluids do not or only minimally experience leakoff, the generated dominant fracture(s) may be formed and propagated efficiently, with high energy connectivity along the created geometry, without the creation of substantial branch fractures therefrom, thereby forming a thick and planar crack with a controlled length and thickness. That is, the amount and type of high efficiency treatment fluid may be used to control the length and width of a dominant fracture in a formation. In contrast, the ultra-low viscosity fluids leakoff during their introduction into a formation, thus resulting in the smaller, wavelike branch fractures described according to the embodiments described herein.

Accordingly, the traditional use of low-viscosity fluids to create dominant fractures results in the creation and propagation of branch fractures that compete with the dominant fracture, thereby resulting in an overall decrease in the size, thickness, planarity, and length of the dominant fracture into the formation and thus a potential decrease in productivity of the formation as a whole. These traditionally formed dominant fractures may thus become pinched off or shortened prematurely without achieving desired size and length. Thus, while complex fracture network geometry is formed using traditional methods, it may be less than ideal or restricted in one or more ways. Conversely, the embodiments described herein allow for the formation of a primary dominant fracture with a desired, extended length that is not restricted and the subsequent formation of branch fractures extending therefrom, thereby facilitating enhanced fracture network complexity and connected induced fracture area.

In some embodiments, the present disclosure provides a method of creating or enhancing fracture network complexity within a subterranean formation through the use of a plurality of specifically designed treatment fluids in combination with proppant particulates. First, a treatment interval is isolated in a subterranean formation wellbore, wherein the treatment fluid comprises one or more openings through the wellbore and into the formation. As used herein, the term "treatment interval," and grammatical variants thereof, refers to a length of a wellbore, which may be any length including the entire length of the wellbore or a portion thereof comprising one or more opening(s). The opening may thus be a single opening or a cluster of openings within the treatment interval, without departing from the scope of the present disclosure. A high efficiency treatment fluid, as defined above, is introduced into the formation through the opening(s) at a pressure above the fracture gradient of the formation to create or enhance at least one dominant fracture therein.

The term "fracture gradient pressure" (or simply "fracture gradient"), and grammatical variants thereof, refers to the pressure necessary to create or enhance a fracture within a particular subterranean formation. The term encompasses both fracture initiation pressure and fracture extension pressure. As used herein, the term "fracture initiation pressure" refers to a pressure that exceeds the minimum horizontal stress of a subterranean formation and produces tinsel rock failure through the introduction of a hydraulic pressure (e.g., using a treatment fluid) to nucleate (i.e., initiate) a fracture. The term "fracture extension pressure," as used herein, refers to the pressure necessary to extend or propagate a nucleated fracture.

After the high efficiency treatment fluid is introduced into the formation above the fracture gradient, an ultra-low viscosity treatment fluid, as defined above, comprising a liquid gas and micro-proppant is introduced into the formation through the opening(s) at a pressure above the fracture gradient to create or enhance at least one branch fracture extending from the dominant fracture (e.g., extending orthogonally). In addition to the at least one branch fracture extending from the dominant fracture, other branch fractures (e.g., secondary, tertiary, and the like, and any combination thereof) may additionally be formed during the introduction of the ultra-low viscosity treatment fluid, without departing from the scope of the present disclosure. As the ultra-low viscosity treatment fluid creates or extends the at least one branch fracture extending from the dominant fracture, at least a portion of the micro-proppant are deposited into the at least one branch fracture, thereby allowing the micro-proppant to prop open the at least one branch fracture upon eventual dissipation of hydraulic pressure from the wellbore and maintain them open during hydrocarbon production of the formation. As used herein, the term "at least a portion" with reference to proppant placement (e.g., micro-proppant and other sized proppant disclosed herein) refers to placement of at least about 60% (and up to 100%) of the total concentration of proppant within a treatment fluid into the desired fracture or fracture network.

More particularly, in some embodiments, the portion of the micro-proppant placed in the at least one branch fracture forms at least a partial monolayer therein. As used herein, the term "partial monolayer," and grammatical variants thereof, refers to a type of proppant pack in which micro-proppant are capable of holding a fracture open, and wherein the separation between any one point of the fracture faces may be less than, or about the same, as the largest exterior dimension of any one of the micro-proppant. Accordingly, in some embodiments, only a partial monolayer of micro-proppant is formed in the at least one branch fracture, and the at least partial monolayer serves to maintain open the at least one branch fracture upon hydraulic pressure dissipation. However, at least a partial multilayer of the micro-proppant may also be formed in the at least one branch fractures, serving to maintain open the at least one branch fractures, without departing from the scope of the present disclosure. As used herein, the term "partial multilayer" refers to a type of proppant pack in which micro-proppant are capable of holding a fracture open, and wherein the separation between any one point of the fracture faces may be more than the largest exterior dimension of any one of the particulates. In a partial monolayer and/or partial multilayer, the micro-proppant may be spaced closely or widely apart in the at least one branch fracture, without departing from the scope of the present disclosure. As used herein, the term "fracture face," and grammatical variants thereof, refers to a portion of a subterranean formation that contacts (including being permeated by) treatment fluids introduced therein.

Next, a proppant treatment fluid is introduced into the subterranean formation, wherein metered into the proppant fluid are proppant particulates that gradually increase in size, and which are all larger than the micro-proppant described herein. At least a portion of the metered proppant particulates are placed into the at least one dominant fracture to form a proppant pack therein. Additionally, the smaller metered proppant particulates can pack into the mouth(s) of the at least one branch fracture(s). The smaller metered proppant particulates may also pack first in the far-field region of the dominant fracture, permeating into the dominant fracture tip and gradually packing the dominant fracture to the dominant fracture mouth. As used herein, the term "fracture mouth," and grammatical variants thereof, refers to the portion of a fracture where fracture nucleation (or initiation) began; the term "fracture tip," and grammatical variants thereof, refers to refers to the boundary between an extending fracture and the formation.

In some embodiments, as described above, a multistage fracturing operation is performed through the same opening(s) at the same treatment interval by repeating the introduction of the high efficiency treatment fluid, the ultra-low viscosity treatment fluid, and the proppant treatment fluid. This allows additional branch fractures to be formed and use of degradable diverting agents in the process, as described herein, through the same opening(s) allows for far-field diversion through restricting the extension of the dominate fracture tip or to control leakoff and growth of the created complex branch fractures to subsequently develop additional branches. As a result, the overall fracturing becomes more complex (more branches and more surface area per unit reservoir volume is created). In other embodiments, a multistage fracturing operation is performed through a different opening(s) at at least a second treatment interval within the same subterranean formation wellbore by repeating the introduction of the high efficiency treatment fluid, the ultra-low viscosity treatment fluid, and the proppant treatment fluid at the at least one second treatment interval. In alternate embodiments, a diverting treatment fluid comprising a base fluid and degradable diverting agents is introduced into the subterranean formation through the opening(s) at the treatment interval after the proppant treatment fluid to allow introduction of subsequent treatment fluids to be diverted to new treatment interval(s). That is, in some instances, after the proppant treatment fluid, a diverting treatment fluid is introduced and the degradable diverting agents plug the opening(s) in the initial treatment fluid and allow subsequent treatment fluids (e.g., subsequent high efficiency treatment fluid(s), subsequent ultra-low viscosity treatment fluid(s), subsequent proppant treatment fluid(s), subsequent diverting treatment fluid(s)) to be introduced at a new or different treatment interval.

Figure 1:
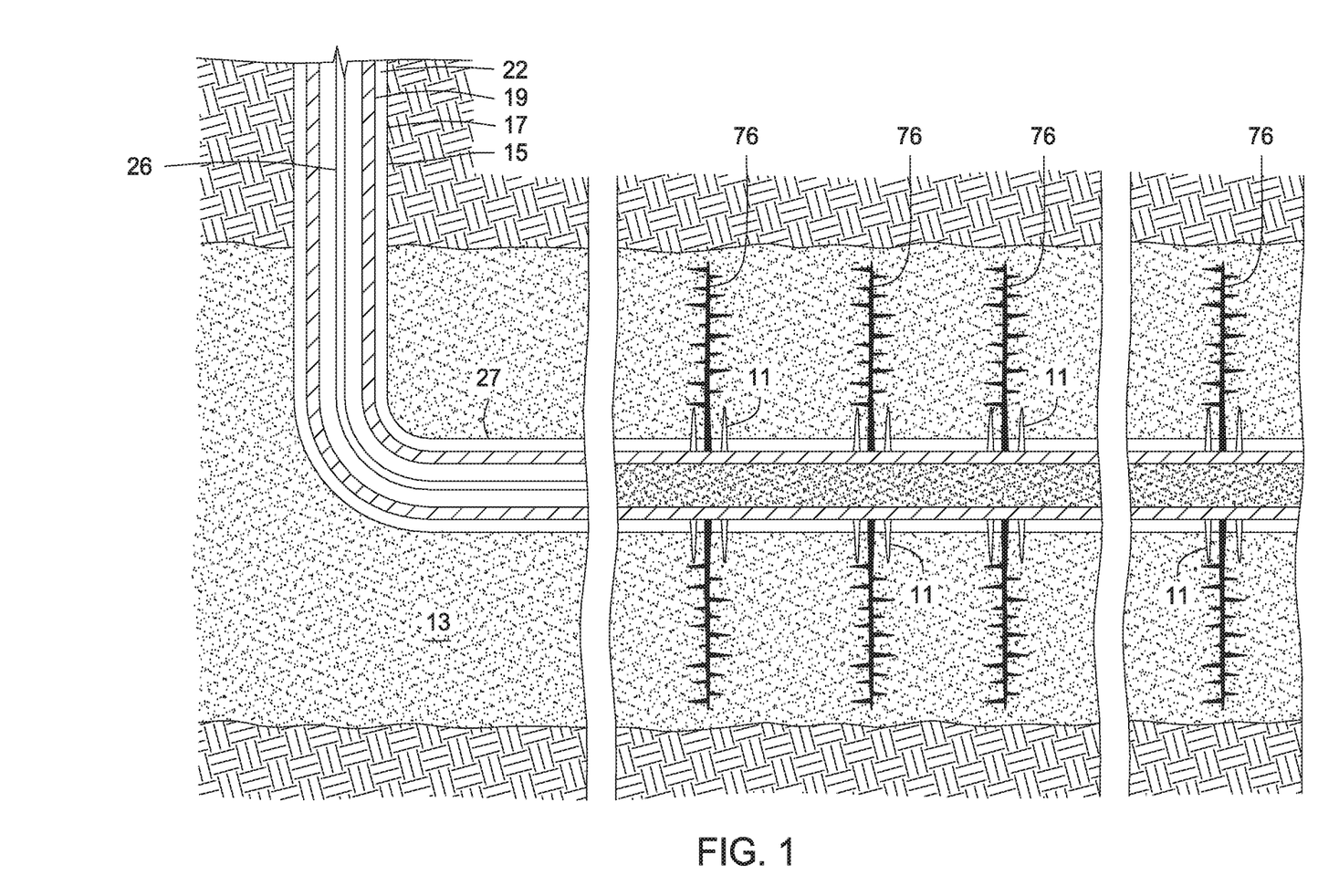
FIG. 1 is a cross-sectional side view of a multistage fracturing treatment operation occurring during the initial stages of pumping the treatment fluids described herein, according to one or more embodiments of the present disclosure.

Referring now to FIG. 1, illustrated is a cross-sectional side view of a multistage fracturing treatment operation occurring during the initial stages of pumping the alternatingly fluids of the present disclosure. As depicted, a tool string 26 is deployed within wellbore 15. Wellbore 15 has a substantially vertical portion 17 and a substantially horizontal portion 27 that extends through a hydrocarbon-bearing subterranean formation 13. A casing string 19 is secured within the wellbore 15 by cement 22. The wellbore 15 need not be vertical or horizontal, but may be either or deviated, without departing from the scope of the present disclosure. Additionally, the wellbore 15 may be open hole or comprise a casing string 19 that is or is not cemented with cement 22, without departing from the scope of the present disclosure.

Tool string 26 is used to introduce a penetrating tool (not shown, such as a perforating tool that is positioned at an area of interest (i.e., a target treatment interval) and is detonated to generate openings 11 (e.g., perforation tunnels) at one or more locations through the wellbore 15 and into the formation 13. As shown, openings 11 at four different target treatment intervals have been created, but it will be appreciated that any number of target treatment intervals and any number of openings 11 may be created along the length of the wellbore 15 to recover hydrocarbons from the formation 13, without departing from the scope of the present disclosure. Thereafter, fractures 76 are created having a dominant fracture and branch fractures in accordance with the embodiments of the present disclosure by introducing the various treatment fluids described herein.

Figure 2:
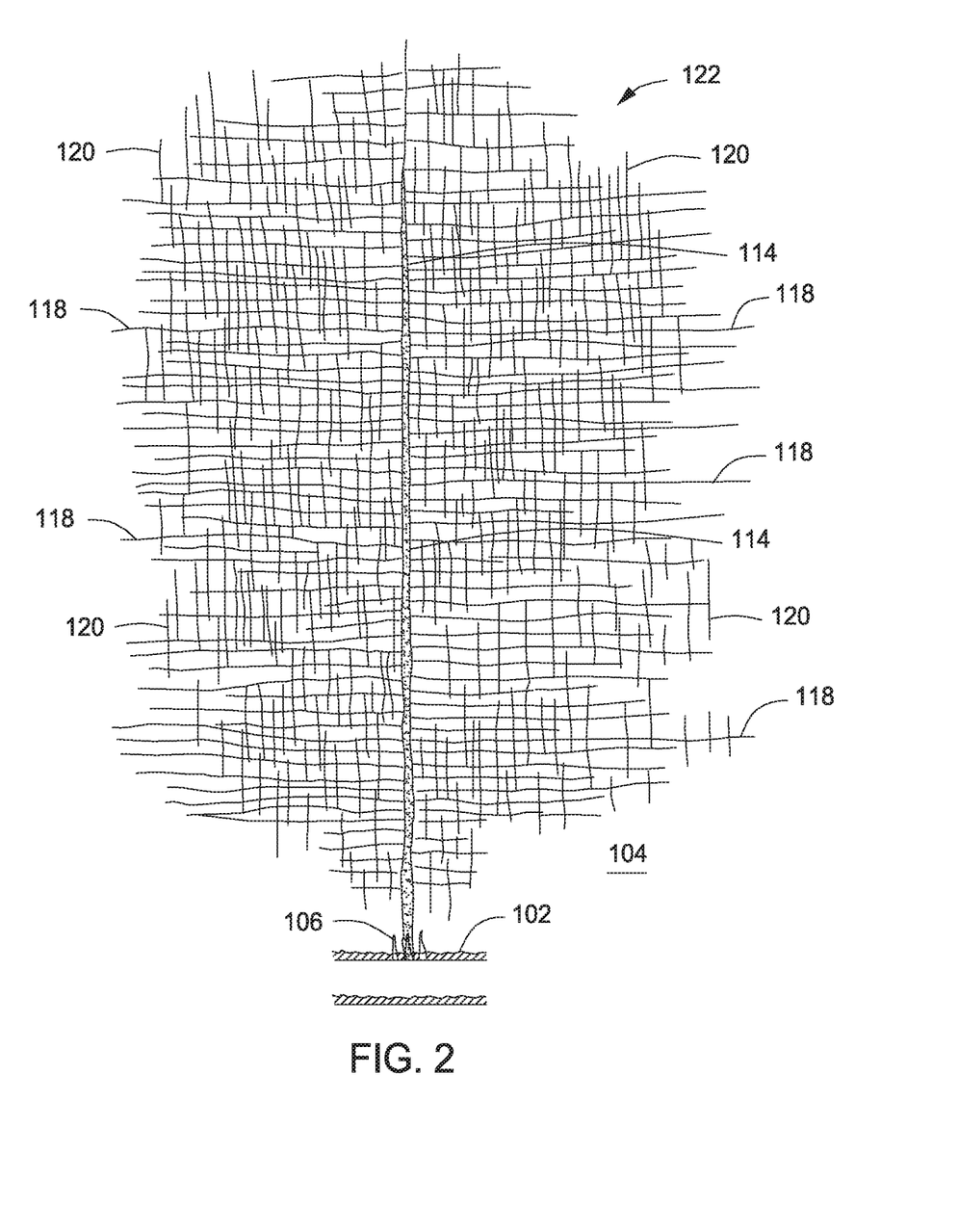
FIG. 2 is a cross-sectional side view of a complex fracture formed using the high efficiency treatment fluid and ultra-low viscosity treatment fluid described herein, according to one or more embodiments of the present disclosure.

Referring now to FIG. 2, illustrated is a cross-sectional side view of the effect of a high efficiency treatment fluid followed by an ultra-low viscosity treatment fluid being introduced into a subterranean formation in accordance with the embodiments described herein to stimulate a complex fracture network. As shown in FIG. 2, a horizontal wellbore 102 is formed in a subterranean formation 104. It will be appreciated that although a horizontal wellbore 102 is depicted in FIG. 2, vertical or deviated wellbores may additionally be used in accordance with the methods of the present disclosure. Moreover, the wellbore 102 may be openhole, cased, or cased with cement at any or all portions, without departing from the scope of the present disclosure. A cluster of openings 106 are formed in through the wellbore and into the wellbore. Three openings are shown through the wellbore 102; however, it will be appreciated that any number of openings 106, including a first opening and any multiple additional openings may be formed, without departing from the scope of the present disclosure. Generally, the number of openings is between about 1 and about 12, encompassing any value and subset therebetween.

As described herein, a high efficiency treatment fluid is first introduced into the wellbore 102, followed by an ultra-low viscosity treatment fluid comprising a liquid gas (and thereafter followed by a proppant treatment fluid and an optional diverting treatment fluid). Each of the fluids is introduced into the formation 104 through the openings 106. Due to fluid mechanics, the high efficiency treatment fluid flows in a direction to create or enhance a thick, planar dominant fracture 114. The high efficiency treatment fluid resists leakoff from the dominant fracture 114 and thus efficiently propagates the dominant fracture 114. Such a dominant fracture 114 may be propagated perpendicularly through horizontal complex bedding planes, such as when the formation 104 is an unconventional reservoir such as shale.

Thereafter, the ultra-low viscosity treatment fluid is introduced into the openings 106 and into the dominant fracture 114, the ultra-low viscosity treatment fluid is designed to experience leakoff into the surrounding formation 104 from the dominant fracture 114 in a direction that may be (as shown) substantially perpendicular to the dominant fracture 114. The ultra-low viscosity treatment fluid thus produces thin (or relatively narrower compared to the dominant fracture 114) branch fractures 118. Any number of additional branch fractures 118 may be initially formed off the dominant fracture 114 at any location along the length of the dominant fracture, without departing from the scope of the present disclosure. Moreover, more than one dominant fracture 114 may be initially formed through the openings (e.g., substantially parallel dominant fractures), without departing from the scope of the present disclosure.

With continued reference to FIG. 2, the complex fracture network 122 is shown and the dominant fracture 114 is formed with multiple branch fractures 114 extending substantially perpendicularly therefrom, although any other configuration may be formed, without departing from the scope of the present disclosure. As the ultra-low viscosity treatment fluid leaks-off and creates or extends the multiple branch fractures 114, it continues to leakoff from the branch fractures 118, thereby forming multiple branch fractures 120 extending from the primary branch fractures 118. Accordingly, the complex fracture network 122 is formed with increased surface area for the production and recovery of hydrocarbon fluids. The complex fracture network 122 encompasses both the near-wellbore and far-field regions within the formation 104. During the formation of the branch fractures 118, the micro-proppant in the ultra-low viscosity treatment fluid is placed within the branch fractures 118 to prop them open (i.e., forming at least a partial monolayer of proppant) and maintain them open during hydrocarbon production of the formation 104.

The high efficiency treatment fluid described herein resists leakoff and has the viscosity defined above. Generally, the high efficiency treatment fluid may include, but are not limited to, linear treatment fluids, crosslinked treatment fluids, and any combination thereof, including aqueous, aqueous-miscible, oil, or oil and aqueous emulsions, surfactants, and the like, and any combination thereof. Primarily, it is necessary that the high efficiency treatment fluid is able to resist leakoff and meets the required viscosity parameters described herein. In some embodiments, the high efficiency treatment fluid comprises a nitrogen gas borate crosslinked fluid (requires pH of about 8 or above), or a foamed liquid carbon dioxide ($CO_2$) non-borate crosslinked fluid, or a binary foamed non-borate crosslinked fluid comprising both liquid $CO_2$ and gas nitrogen ($N_2$), where greater than 50% of the combined liquid $CO_2$ and gas $N_2$ is liquid $CO_2$. The most common internal phases for foams are nitrogen and carbon dioxide. Nitrogen is an inert gas which makes it compatible with most fracturing fluids and formation types. Carbon dioxide foams have better static stability and longer half-life compared to nitrogen foams. These benefits are attributed to their higher density, which results in smaller diameter bubbles that are inherently more stable. However, compatibility is an issue with carbon dioxide foams. When dissolved in water, carbon dioxide produces low pH fluids. Therefore, the fracturing fluids used in conjunction with $CO_2$ must be pH compatible. Borate crosslinked gels cannot be used with $CO_2$. Foamed crosslinked fluids (e.g., gels) include an internal gas phase, an external liquid phase, and are defined by their texture, which refers to bubble size and distribution. Foaming agents are included in the liquid fluids to generate the emulsion when commingled with the liquid gas or vaporized nitrogen gas stream.

The ultra-low viscosity treatment fluid, as defined above, comprises a liquid gas. The liquid gas may include, but is not limited to, liquid carbon dioxide, a liquid gas hydrocarbon, a natural gas liquid, and any combination thereof. The liquid gas hydrocarbon may include, but is not limited to, liquid natural gas which includes mostly methane and relatively smaller amount(s) of larger carbon compounds such as ethane, propane, butane, pentane, and the like, and any combination thereof. In some preferred embodiments, the liquid gas is selected from natural gas liquids. These are components of natural gas that are separated from the gas state in the form of liquids. Ethane, propane, butane, isobutane, and pentane are all natural gas liquids. In some preferred embodiments, the selected liquid gas is liquid carbon dioxide, which is particularly effective at promoting leakoff (e.g., to create or extend branch fractures, particularly under high pressure) and shear fractures in the formation. The micro-proppant, as described below, in the ultra-low viscosity treatment fluid may have a unit mesh size in the range of less than 100 micrometers ($\mu m$), encompassing any value and subset therebetween. As used herein, the term "unit mesh size," and grammatical variants thereof, refers to a size of an object (e.g., a particulate) that is able to pass through a square area having each side thereof equal to a specified numerical value. In some embodiments, the micro-proppant have a unit mesh size in the range of about 0.1 $\mu m$ to 100 $\mu m$, encompassing any value and subset therebetween. Typically, the micro-proppant are included in the ultra-low viscosity treatment fluid in a concentration in the range of about 1.2 grams per liter (g/L) to about 120 g/L (equivalent to about 0.01 pounds per gallon (lb/gal) to about 1 lb/gal), encompassing any value and subset therebetween. In some embodiments, the micro-proppant is also included in the size and concentration described above in the high efficiency treatment fluid, the proppant treatment fluid, and/or the diverting treatment fluid, without departing from the scope of the present disclosure.

The proppant treatment fluid and diverting treatment fluids may comprise any base fluid, including aqueous, aqueous-miscible, oil, or oil and aqueous emulsions, surfactants, and the like, and any combination thereof, without departing from the scope of the present disclosure.

The "proppant treatment fluid," and grammatical variants thereof, refers to herein as any fluid having a viscosity in the range of about 1 cP to about 3000 cP, encompassing any value and subset therebetween, and comprising proppant particulates in the range of greater than 100 micrometers ($\mu m$). The proppant treatment fluid described herein may, in some embodiments, be in the form of a slickwater fluid, a linear fluid, a crosslinked fluid, a foamed liquid $CO_2$ linear fluid, a foamed liquid $CO_2$ non-borate crosslinked fluid, a foamed gas $N_2$ linear fluid, a foamed gas $N_2$ borate crosslinked fluid, a binary foamed non-borate crosslinked fluid comprising both liquid $CO_2$ and gas $N_2$, a binary foamed linear fluid comprising both liquid $CO_2$ and gas $N_2$, and any combination thereof. If the proppant treatment fluid selected is a binary foamed fluid comprising both liquid $CO_2$ and gas $N_2$, greater than 50% of the combined liquid $CO_2$ and gas $N_2$ is liquid $CO_2$.

In some instances, the proppant particulates metered into the proppant treatment fluid have a size of greater than 100 $\mu m$ to about 1000 $\mu m$, encompassing any value and subset therebetween. Typically, the proppant particulates are metered into the proppant treatment fluid in an average concentration of about 1.2 g/L to about 840 g/L (equivalent to about 0.01 lb/gal to about 7 lb/gal), encompassing any value and subset therebetween.

The "diverting treatment fluid," and grammatical variants thereof, refers to herein as any fluid having a degradable diverting agent therein and having a viscosity in the range of about 1 cP to about 100 cP, encompassing any value and subset therebetween. Typically, the degradable diverting agent is present in a concentration of about 12 g/L to about 840 g/L (equivalent to about 0.1 lb/gal to about 7 lb/gal), encompassing any value and subset therebetween.

Aqueous base fluids suitable for use in the treatment fluids described herein may include, but are not limited to, fresh water, saltwater (e.g., water containing one or more salts dissolved therein), brine (e.g., saturated salt water), seawater, produced water (e.g., water produced as a byproduct from a subterranean formation during hydrocarbon production), waste water (e.g., water that has been adversely affected in quality by anthropogenic influence) that is untreated or treated, and any combination thereof. Generally, the water may be from any source, provided that it does not contain components that might adversely affect the stability and/or performance of the treatment fluids. Suitable aqueous-miscible fluids may, in some embodiments, include, but not be limited to, an alcohol (e.g., methanol, ethanol, n-propanol, isopropanol, n-butanol, sec-butanol, isobutanol, and t-butanol), a glycerin, a glycol (e.g., polyglycols, propylene glycol, and ethylene glycol), a polyglycol amine, a polyol, any derivative thereof, any in combination with a salt (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous base fluid described above, and any combination thereof.

Suitable oil-based fluids may include, but are not limited to, an alkane, an olefin, an aromatic organic compound, a cyclic alkane, a paraffin, a diesel fluid, a mineral oil, a desulfurized hydrogenated kerosene, and any combination thereof. Suitable water-in-oil emulsions, also known as invert emulsions, may have an oil-to-water ratio of from a greater than about 50:50, to less than about 100:0, encompassing any value and subset therebetween. Suitable oil-in-water emulsions may have a water-to-oil ratio of from a greater than about 50:50, to less than about 100:0, encompassing any value and subset therebetween. It should be noted that for water-in-oil and oil-in-water emulsions, any mixture of the above may be used including the water being and/or comprising an aqueous-miscible fluid.

Viscoelastic surfactant fluids for use as the base fluids described herein may include, but are not limited to those that are cationic, anionic, or amphoteric in nature. Suitable examples of viscoelastic surfactant fluids may include, but are not limited to, a methyl ester sulfonate, a hydrolyzed keratin, a taurate, an amine oxide, an ethoxylated amide, an alkoxylated fatty acid, an alkoxylated alcohol, an ethoxylated fatty amine, an ethoxylated alkyl amine, and any combination thereof.

In some embodiments, the treatment fluids for use in conjunction with the embodiments of the present disclosure may be foamed. As used herein the term "foam," and grammatical variants thereof, refers to a two-phase composition having a continuous liquid phase and a discontinuous gas phase. In some embodiments, treatment fluids for use in conjunction with the embodiments of the present disclosure may comprise a base fluid, a gas, and a foaming agent. In alternate embodiments, the treatment fluids comprise a foamed liquid gas, as defined above. For example, in some embodiments the high efficiency treatment fluid, the proppant fluid, and/or the diverting treatment fluid comprise a foamed liquid gas selected from the group consisting of a foamed liquid carbon dioxide, a foamed liquid gas hydrocarbon, a foamed natural gas liquid, and any combination thereof.

Suitable gases for use in the foamed treatment fluids may include, but are not limited to, nitrogen, carbon dioxide, air, methane, helium, argon, and any combination thereof. By way of non-limiting example, carbon dioxide foams may have deeper well capability than nitrogen foams because carbon dioxide foams have greater density than nitrogen gas foams, which may be preferred for use in the high efficiency pad fluids described herein, although carbon dioxide foams may additionally be used for any of the ultra-low viscosity treatment fluids described herein, provided that the viscosity requirements for each treatment fluid is satisfied.

In some embodiments, the quality of the foamed treatment fluids may range from about 5% to about 95% gas volume, encompassing any value and subset therebetween. Most preferably, the foamed treatment fluid may have a foam quality from about 85% to about 95%, or about 90% to about 95%, encompassing any value and subset therebetween.

Suitable foaming agents may include, but are not limited to, cationic foaming agents, anionic foaming agents, amphoteric foaming agents, nonionic foaming agents, and any combination thereof. Examples of suitable foaming agents may include, but are not limited to, surfactants like betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, and any combination thereof. Foaming agents may be included in foamed treatment fluids at concentrations ranging typically from about 0.05% to about 2% by weight of the liquid component of the treatment fluid (e.g., from about 0.5 to about 20 gallons per 1000 gallons of liquid), encompassing any value and subset therebetween.

The various treatment fluids described herein may comprise a gelling agent to obtain the desired viscosity, as described above. Suitable gelling agents may include, but are not limited to, a natural polymer, a synthetic polymer, and any combination thereof. Oligomers, including those listed herein, capable of associating to form higher viscosity networks may also be used as the gelling agents, without departing from the scope of the present disclosure.

Suitable gelling agents may include, but are not limited to, polysaccharides, biopolymers, and/or derivatives thereof that contain one or more of these monosaccharide units: galactose, amylose, mannose, glucoside, glycosaminoglycan, glucose, xylose, arabinose, fructose, glucuronic acid, pyranosyl sulfate, and any combination thereof. Specific examples of suitable polysaccharides may include, but are not limited to, a guar gum (e.g., hydroxyethyl guar, hydroxypropyl guar, carboxymethyl guar, carboxymethylhydroxyethyl guar, carboxymethylhydroxypropyl guar, and the like), a cellulose derivative (e.g., hydroxyethyl cellulose, carboxyethylcellulose, carboxymethylcellulose, carboxymethylhydroxyethylcellulose, and the like), xanthan, scleroglucan, succinoglycan, diutan, and any combination thereof.

Examples of suitable synthetic polymers may include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamide and methacrylamidoalkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, any derivatives thereof, and any combination thereof.

In certain embodiments, the gelling agent may comprise an acrylamide/2-(methacryloyloxy)ethyltrimethylammonium methyl sulfate copolymer. In other certain embodiments, the gelling agent may comprise an acrylamide/2-(methacryloyloxy)ethyltrimethylammonium chloride copolymer. In yet other embodiments, the gelling agent may comprise a derivatized cellulose that comprises cellulose grafted with an allyl or a vinyl monomer.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the treatment fluids described herein in an amount of from about 0.001% to about 0.5% by weight per volume (wt/vol) of the base fluid (including a liquid gas), encompassing any value and subset therebetween.

In some embodiments, it may be desirable to crosslink the gelling agent(s) in the treatment fluids to further increase the viscosity thereof. Inclusion of crosslinking agents can achieve the increased viscosity due to crosslinking. When included in a treatment fluid, the crosslinking agents may include, but are not limited to, a borate ion, a metal ion, or similar component that is capable of crosslinking at least two molecules of the gelling agent. Examples of suitable crosslinking agents may include, but are not limited to, borate ions, magnesium ions, zirconium IV ions, titanium IV ions, aluminum ions, antimony ions, chromium ions, iron ions, copper ions, magnesium ions, zinc ions, and any combination thereof. These ions may be provided by providing any compound that is capable of producing one or more of these ions.

In some embodiments, the crosslinking agent may be a multifunctional boronic acid crosslinking agent comprising a copolymer that comprises at least one boronic acid monomer unit and at least one water-soluble monomer unit. The multifunctional boronic acid crosslinking agent may be a random copolymer. The at least one boronic acid monomer unit may be a polymerizable vinyl, allyl, or acrylic functional group; an aryl, alkyl, alkenyl, or alkynyl boronic acid; and any combination thereof. The at least one water-soluble monomer unit may be selected from the group consisting of an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivative of acrylamide, a quaternary salt derivative of acrylic acid, an alkyl acrylate, an alkyl methacrylate, an alkyl acrylamide, an alkyl methacrylamide, an alkyl dimethylammoniumethyl methacrylate halide, an alkyl dimethylammoniumpropyl methacrylamide halide, any derivative thereof, and any combination thereof. For example, the boronic acid monomer unit may be 3-acrylamidophenyl boronic acid and the water-soluble monomer unit may be an acrylamide (e.g., N,N-dimethylacrylamide). In some embodiments, the ratio of the boronic acid monomer unit(s) to the water-soluble monomer unit(s) is in the range of from about 1:1 to about 1:200, encompassing any value and subset therebetween.

In certain embodiments, the crosslinking agent may be formulated to remain inactive until it is "activated" by, among other things, certain conditions in the treatment fluid (e.g., pH, temperature, etc.) and/or interaction with some other substance. This may allow ease of pumping into the formation and, once therein, the treatment fluid may achieve its desired viscosity before being used to create or enhance a fracture (e.g., dominant fracture or branch fracture). In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place, or by frangibility of the encapsulating material such that the crosslinking agent is released upon encountering a stress (e.g., removal of hydraulic pressure and fracture closure).

The encapsulating material may be any material capable of delaying the action of the crosslinking agent including, but not limited to, a wax, polyvinyl alcohol, a polymer, a protein, a polysaccharide, a degradable material, or any combination thereof. Examples of such encapsulating materials may include, but are not limited to, polylactic acid, polyglycolic acid, a polyamide, a polyalkylene glycol (e.g., polyethylene glycol), polyvinyl alcohol, polyvinyl ester, polysiloxane, polyurethane, polyurethane copolymers, polyacrylic acid, a polyacrylic acid derivative, collagen, gelatin, a cellulose derivative (e.g., alkyl cellulose, hydroxyalkyl cellulose, cellulose acetate, and the like), and any combination thereof.

In certain embodiments, the crosslinking agent may be present in the treatment fluids in an amount in the range of from about 0.001% to about 0.1% wt/vol of the base fluid of the treatment fluid, encompassing any value and subset therebetween.

As discussed above, while a crosslinking agent may be included in any of the treatment fluids described herein, in some embodiments, the crosslinking affect may increase the viscosity of the various treatment fluids described above. In some embodiments, the ultra-low viscosity treatment fluids may be "linear," meaning that they include a gelling agent, but do not include a crosslinking agent. In other embodiments, the ultra-low viscosity treatment fluids may be a "slickwater" fluid. As used herein, the term "slickwater fluid" refers to the addition of a friction reducing agent to the base fluids described herein, such as polyacrylamide. Other friction reducing agents may include, but are not limited to, sepiolite, whelan gum, xanthan gum, hydroxyethyl cellulose, bentonite, attapulgite, and any combination thereof. When the ultra-low viscosity treatment fluid is a slickwater fluid, the friction reducing agent may be included therein in an amount of from about 0.001% to about 0.2% wt/vol of the base fluid (including liquid gas) of the treatment fluid, encompassing any value and subset therebetween.

In some embodiments, when greater than one dominant fracture and branch fracture is formed within the same or different treatment intervals into the subterranean formation, as described herein, such complex fractures may interconnect at one or both of a near-wellbore region(s) and/or a far-field region(s) of the subterranean formation, thereby increasing fracture network complexity. As used herein, the term "interconnected," and grammatical variants thereof (e.g., "interconnection," and the like), refers fractures (i.e., main and branch fractures) that are in fluid communication, regardless of fluid flow permeability. In some instances, the propped dominant or branch fractures described herein may be interconnected in the near-wellbore region at a location in the range of from about 1.5 meters (m) to about 10 m into the formation from the wellbore (or about 5 feet to about 33 feet), encompassing any value and subset therebetween. In other embodiments, the propped main or branch fractures described herein may be interconnected in the far-field wellbore region at a location in the range of from about 11 m to about 300 m into the formation from the wellbore (about 36 feet to about 984.3 feet), encompassing any value and subset therebetween.

The degradable diverting agent(s) form a fluidic seal in one or more openings at one or more treatment intervals. As used herein, the term "fluidically seal," and grammatical variants thereof (e.g., "fluidically sealing," "fluidic seal," and the like), refers to a barrier that is capable of blocking fluid flow such that permeability of the barrier is no more than about 0.01 millidarcies (md) under natural conditions in a subterranean formation or during a subterranean formation operation (e.g., during a multistage fracturing operation as described herein). The degradable diverting agent(s) may degrade over time or in response to a particular stimulant (e.g., temperature, pressure, salinity, and the like), as discussed in greater detail below. Degradation of the degradable diverting agent(s) removes at least a portion of the fluidic seal, thereby allowing fluid flow between the wellbore and the relevant opening(s). As used herein, the term "removing at least a portion of the fluidic seal," and grammatical variants thereof, means restore fluid flow permeability through a fluidic seal described herein by at least 0.01 darcies.

The base fluids for forming the various treatment fluids described herein that are not (or are in combination with) the liquid gas base fluids may be any fluid suitable for use in a subterranean formation. Collectively, these fluids are referred to herein as "treatment fluids," and examples of suitable base fluids for use in the treatment fluids may include, but are not limited to, the liquid gasses described above, an aqueous base fluid, an aqueous miscible base fluid, an oil base fluid, a water-in-oil emulsion, an oil-in-water emulsion, a viscoelastic surfactant base fluid, and any combination thereof.

The material for forming the micro-proppant and the metered proppant particulates described herein (collectively referred to herein simply as "proppant particulates") may be any material, naturally-occurring or man-made, suitable for use in a subterranean formation and appropriate for use in the embodiments as described herein. Suitable materials for forming the proppant particulates described herein may include, but are not limited to, sand (e.g., desert sand, beach sand), cementitious material (e.g., Portland cement, Portland cement blends (e.g., blast-furnace slag), and non-Portland cement (e.g., super-sulfated cement, calcium aluminate cement, high magnesium-content cement, and the like), and the like), bauxite, alumino-silicate material, ceramic material (e.g., ceramic microspheres), glass material, polymeric material (e.g., ethylene-vinyl acetate or composite materials), metal (e.g., alkali metals, alkaline earth metals, transition metals, post-transition metals, metalloids), zeolites, polytetrafluoroethylene material, thermoplastic material (e.g., nylon thermoplastic) nut shell pieces, a cured resinous particulate comprising nut shell pieces, seed shell pieces, a cured resinous particulate comprising seed shell pieces, fruit pit pieces, a cured resinous particulate comprising fruit pit pieces, wood, composite particulates, and any combination thereof. Suitable composite particulates may comprise a binder and a filler material, wherein suitable filler materials may include, but are not limited to, silica, alumina, fumed carbon, carbon black, graphite, mica, titanium dioxide, barite, meta-silicate, calcium silicate, kaolin, talc, zirconia, boron, fly ash, hollow glass microspheres, solid glass, nanoparticulates, and any combination thereof.

The shape of the proppant particulates may be such that it is substantially spherical or substantially non-spherical, which may be cubic, polygonal, fibrous, or any other non-spherical shape. Such substantially non-spherical proppant particulates may be, for example, cubic-shaped, rectangular-shaped, rod-shaped, ellipse-shaped, cone-shaped, pyramid-shaped, cylinder-shaped, platelet-shaped, fiber-shaped, and any combination thereof. That is, in embodiments wherein the proppant particulates are substantially non-spherical, the aspect ratio of the material may range such that the material is fibrous to such that it is cubic, octagonal, or any other configuration.

In some embodiments, a portion of the proppant particulates may be formed from degradable particles, provided that they meet the sizes for the micro-proppant particulates or metered proppant particulates. The degradable particles, whether serving as the micro-proppant particulates or the metered proppant particulates, are collectively referred to herein as "degradable proppant particulates." One purpose of including degradable particulates is to increase the permeability of the propped dominant and/or branch fracture(s), such that after the degradable particulates degrade, interstitial spaces between the particulates in the proppant pack or monolayer/multilayer.

In some embodiments, the degradable particles used are oil-degradable materials. Where such oil-degradable proppant particulates are used, in the event the closure of the fracture undesirably compacts the proppant (thus undesirably reducing the permeability of the proppant pack) the oil-degradable proppant may be degraded by the produced fluids, thus restoring at least some of the lost permeability. The degradable proppant particulates may also be degraded by materials purposely placed in the formation by injection, mixing the degradable proppant particulates with delayed reaction degradation agents, or other suitable means to induce degradation.

In some embodiments, the degradable proppant particulates are preferably substantially uniformly distributed throughout a formed proppant pack in the dominant fracture(s) or branch fracture(s). Over time, the degradable proppant particulates will degrade, in situ, causing the degradable proppant particulates to substantially be removed from the proppant pack and to leave behind voids therein. These voids enhance the porosity of the proppant pack, which may result, in situ, in enhanced conductivity.

Suitable degradable proppant particulates include oil-degradable polymers. Oil-degradable polymers that may be used in accordance with the embodiments of the present disclosure may be either natural or synthetic polymers. Suitable examples may include, but are not limited to, a polyacrylic, a polyamide, a polyolefin (e.g., polyethylene, polypropylene, polyisobutylene, polystyrene, and the like), and the like, and any combination thereof. Other suitable oil-degradable polymers include those that have a melting point which is such that the polymer will dissolve at the temperature of the subterranean formation in which it is placed, such as a wax material.

In some embodiments, it is desirable that the degradable proppant particulates have similar particle size, shape, and specific gravity as those of the proppant particulates described above. Such similarity may result in enhanced distribution of degradable proppant particulates among the non-degradable proppant particulates, thus minimizing the segregation of the two types of proppant particulates and thus maximizes distribution of the void spaces in the proppant pack upon degradation of the degradable proppant particulates.

Suitable examples of degradable polymers that may be used in accordance with the embodiments of the present disclosure may include, but are not limited to, a polysaccharide (e.g., dextran, cellulose, and the like), a chitin, a chitosan, a protein, an aliphatic polyester, a poly(lactide), a poly(glycolide), a poly(s-caprolactone), a poly(hydroxybutyrate), a poly(anhydride), an aliphatic polycarbonate, an aromatic polycarbonate, a poly(orthoester), a poly(amino acid), a poly(ethylene oxide), a polyphosphazene, and any combination thereof. Of these suitable polymers, aliphatic polyesters and poly(anhydrides) may be preferred.

Poly(anhydrides) are another type of particularly suitable degradable polymer useful in the embodiments of the present disclosure. Poly(anhydride) hydrolysis proceeds, in situ, via free carboxylic acid chain-ends to yield carboxylic acids as final degradation products. The erosion time can be varied over a broad range of changes in the polymer backbone. Examples of suitable poly(anhydrides) may include, but are not limited to, poly(adipic anhydride), poly(suberic anhydride), poly(sebacic anhydride), poly(dodecanedioic anhydride), poly(maleic anhydride), poly(benzoic anhydride), and any combination thereof.

Dehydrated salts may be used in accordance with the embodiments of the present disclosure as degradable proppant particulates. A dehydrated salt is suitable for use in the embodiments of the present disclosure if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax), anhydrous boric acid, and any combination thereof. These anhydrous borate materials are only slightly soluble in water. However, with time and heat in a subterranean environment, the anhydrous borate materials react with surrounding aqueous fluid and are hydrated. The resulting hydrated borate materials are highly soluble in water as compared to anhydrous borate materials and, as a result, degrade in an aqueous fluid. In some instances, the total time required for the anhydrous borate materials to degrade in an aqueous fluid is in the range of from about 8 hours to about 72 hours, encompassing any value and subset therebetween, depending upon the temperature of the subterranean zone in which they are placed. Other examples include organic or inorganic salts like acetate trihydrate.

Blends of certain degradable materials may also be suitable as the degradable proppant particulates described herein. One example of a suitable blend of materials is a mixture of poly(lactic acid) and sodium borate, where the mixing of an acid and base could result in a neutral solution where this is desirable. Another example would include a blend of poly(lactic acid) and boric oxide. Other materials that undergo an irreversible degradation may also be suitable, if the products of the degradation do not undesirably interfere with either the conductivity of the proppant matrix or with the production of any of the fluids from the subterranean formation.

In some embodiments, a preferable result is achieved if the degradable proppant particulates degrade slowly over time as opposed to instantaneously. Even more preferable results have been obtained when the degradable proppant particulates does not begin to degrade until after the proppant pack has developed some compressive strength. The slow degradation of the degradable proppant particulates, in situ, helps to maintain the stability of the proppant pack.

In some embodiments of the present disclosure, from about 10% to about 90% of the total proppant particulates used in a treatment fluid are degradable proppant particulates, encompassing any value and subset therebetween. In other embodiments, from about 20% to about 70% of the total proppant particulates in a treatment fluid are degradable proppant particulates, or about 25% to about 50% of the total proppant particulates in a treatment fluid are degradable proppant particulates.

In some embodiments, the degradable proppant particulates are fiber-shaped, which may beneficially act to increase the ability of the treatment fluid in which they are included to suspend the proppant particulates also included therein, thus decreasing the need to additional, and perhaps costly additives, to ensure that such proppant remains in suspension. The fiber-shape may further facilitate forming at least partial monolayer of micro-proppant and the proppant pack of metered proppant particulates by allowing a web-like complex to be formed for propping open branch and dominant fractures, as described herein. The fiber-shaped degradable proppant particulates include all known shapes having a medium to high aspect ratio, defined as an aspect ratio of greater than about 5, 10, or 25 to an unlimited upper limit, including greater than about 500, 5000, or 10000, encompassing every value and subset therebetween.

The degradable diverting agents for use in the diverting treatment fluids of the present disclosure may be any degradable diverting agent capable of diverting the distribution of a treatment fluid across a first location (e.g. treatment interval or portion of a treatment interval) for use in another location (e.g., another treatment interval or a portion of the same treatment interval). Such degradable diverting agents create a temporary blocking effect that promotes continued treatment in a different area of a wellbore, enabling enhanced productivity across a length of the wellbore. In some embodiments, the degradable diverting agents are used for far-field diversion. In such cases, the size of the degradable diverting agents should be about +/−20% of the size of the micro-proppant in order to embed in the interstitial spaces therebetween and form a seal in the mouth of the branch fracture(s). In other embodiments, the degradable diverting agents are used for near-wellbore diversion, and the size of the degradable diverting agents should be about +/−20% of the size of the metered proppant particulates in order to embed in the interstitial spaces therebetween and form a seal in the mouth of the dominant fracture(s).

The degradable diverting agents may additionally be of any size or shape mentioned above with reference to the proppant particulates. As an example, the degradable diverting agents may be fiber-shaped, which may beneficially act to increase the ability of the diverting treatment fluids to maintain the degradable diverting agents in suspension for placement in the far-field or near-wellbore areas for forming a fluidic seal. The fiber-shape may further facilitate forming the fluidic seal because the fiber-shape facilitates embedment into and between proppant particulates, thereby forming a tighter or more impermeable fluidic seal. Like the proppant particulates described above, the fiber-shaped degradable diverting agents include all known shapes having a medium to high aspect ratio, defined as an aspect ratio of greater than about 5, 10, or 25 to an unlimited upper limit, including greater than about 500, 5000, or 10000, encompassing every value and subset therebetween.

Suitable degradable diverting agents may include, but are not limited to, materials comprising a fatty alcohol, a fatty ester, a proteinous material, a fatty acid salt, and any combination thereof. Examples of suitable fatty alcohols may include, but are not limited to, a montanyl alcohol; a tert-butylhydroquinone; a cholesterol; a cholesteryl nonanoate; a benzoin; a borneol; an exo-norborneol; a glyceraldehyde triphenylmethanol; a dimethyl terephthalate; a camphor; a cholecalciferol; a ricinoleyl alcohol; a 1-Heptacosanol; a 1-Tetratriacontanol; a 1-Dotriacontanol; a 1-Hentriacontanol; a 1-Tricontanol; a 1-Nonacosanol; a 1-Octasanol; a 1-Hexacosanol; a 1,14-Tetradecanediol; a 1,16-Hexadecanediol; a 1,17-Heptadecanediol; a 1,18-Octadecanediol; a 1,19-Nonadecanediol; a 1,20-Eicosanediol; a 1,21-Heneicosanediol; a 1,22-Docosanediol; a myricyl alcohol; and any combination thereof. Examples of suitable fatty esters for use in forming the degradable diverting agents described herein may include, but are not limited to, prednisolone acetate, cellobiose tetraacetate, terephthalic acid dimethyl ester, an ester wax (e.g., carnauba wax, ouricouri wax, olho wax, flora wax, palha wax, castor wax, opalwax, and the like), and the like, and any combination thereof.

As used herein, the term "proteinous material," and grammatical variants thereof, for use in forming the degradable diverting agents herein refers to any group of complex organic macromolecules that contain carbon, hydrogen, oxygen, nitrogen, and/or sulfur and are composed of one or more chains of amino acids. Examples of suitable proteinous material may include, but are not limited to, prolamins, such as gliadin, hordein, secalin, zein, avenin, and any combination thereof. Examples of suitable fatty acids for use as a degradable diverting agent may include, but are not limited to, sucrose distearate, calcium stearate, glyceryl monostearate, zinc stearate, and magnesium stearate, and the like, and any combination thereof.

In some embodiments, one or more treatment fluids, particularly the ultra-low viscosity treatment fluid, further comprises nanoparticulates, which can aid in particulate suspension and stabilization of unconfined formation particulates. The nanoparticulates may be of any shape suitable for use in a subterranean formation and as described above with reference to the proppant particulates. Suitable shapes may include, but are not limited to, sphere-shaped, rod-shaped, fiber-shaped, cup-shaped, cube-shaped, truncated cube-shaped, rhombic dodecahedron-shaped, truncated rhombic-dodecahedron-shaped, oval-shaped, diamond-shaped, pyramid-shaped, polygon-shaped, torus-shaped, dendritic-shaped, astral-shaped, cylinder-shaped, irregular-shaped, triangular-shaped, bipyramid-shaped, tripod-shaped, wire-shaped, tetrahedron-shaped, cuboctahedron-shaped, octahedron-shaped, truncated octahedron-shaped, icosahedron-shaped, and any combination thereof. In some embodiments, the nanoparticulates of the present disclosure range in unit mesh size from about 1 to about 200 nanometers ("nm"), or about 1 to about 100 nm, encompassing any value and subset therebetween.

In some embodiments, the nanoparticulates used in the methods of the present disclosure, are produced from any material described with reference to the proppant particulates above including materials such as, but not limited to, a silk, a cellulose, a starch, a polyamid, carbon silica, alumina, zirconia, a polyurethane, a polyester, a polyolefin, collagen, a polyglycolic, and any combination thereof. However, other nanoparticulate materials may also be utilized, without departing from the scope of the present disclosure.

In some embodiments, the treatment fluids described herein may further comprise an additive, provided that the additive does not interfere with the formation of a complex fracture network or fluidic seal of the present disclosure. Suitable additives may include, but are not limited to, a salt, a breaker, a weighting agent, an inert solid, an emulsifier, a dispersion aid, a corrosion inhibitor, an emulsion thinner, an emulsion thickener, a surfactant, a lost circulation material, a pH control additive, a biocide, a stabilizer, a fluid loss control agent, a scale inhibitor, a gas hydrate inhibitor, an oxidizer, a reducer, a clay stabilizing agent, and any combination thereof.

In various embodiments, systems configured for delivering the treatment fluids and proppant fluids (collectively referred to simply as "fluids" below) described herein to a downhole location are described. In various embodiments, the systems can comprise a pump fluidly coupled to a tubular, the tubular containing the fluids described herein. It will be appreciated that while the system described below may be used for delivering either or both of the treatment fluid and/or proppant fluid, each fluid is delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the fluids to a subterranean formation at or above a fracture gradient of the subterranean formation, but it may also be used in cases where fracturing is not desired. In some embodiments, the high pressure pump may be capable of fluidly conveying particulate matter, such as the micro-proppant particulates and/or the metered proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the fluids to the high pressure pump. In such embodiments, the low pressure pump may "step up" the pressure of the fluids before reaching the high pressure pump.

In some embodiments, the systems described herein can further comprise a mixing tank that is upstream of the pump and in which the fluids are formulated. In various embodiments, the pump (e.g., a low pressure pump, a high pressure pump, or a combination thereof) may convey the fluids from the mixing tank or other source of the fluids to the tubular. In other embodiments, however, the fluids may be formulated offsite and transported to a worksite, in which case the fluid may be introduced to the tubular via the pump directly from its shipping container (e.g., a truck, a railcar, a barge, or the like) or from a transport pipeline. In either case, the fluids may be drawn into the pump, elevated to an appropriate pressure, and then introduced into the tubular for delivery downhole.

Figure 3:
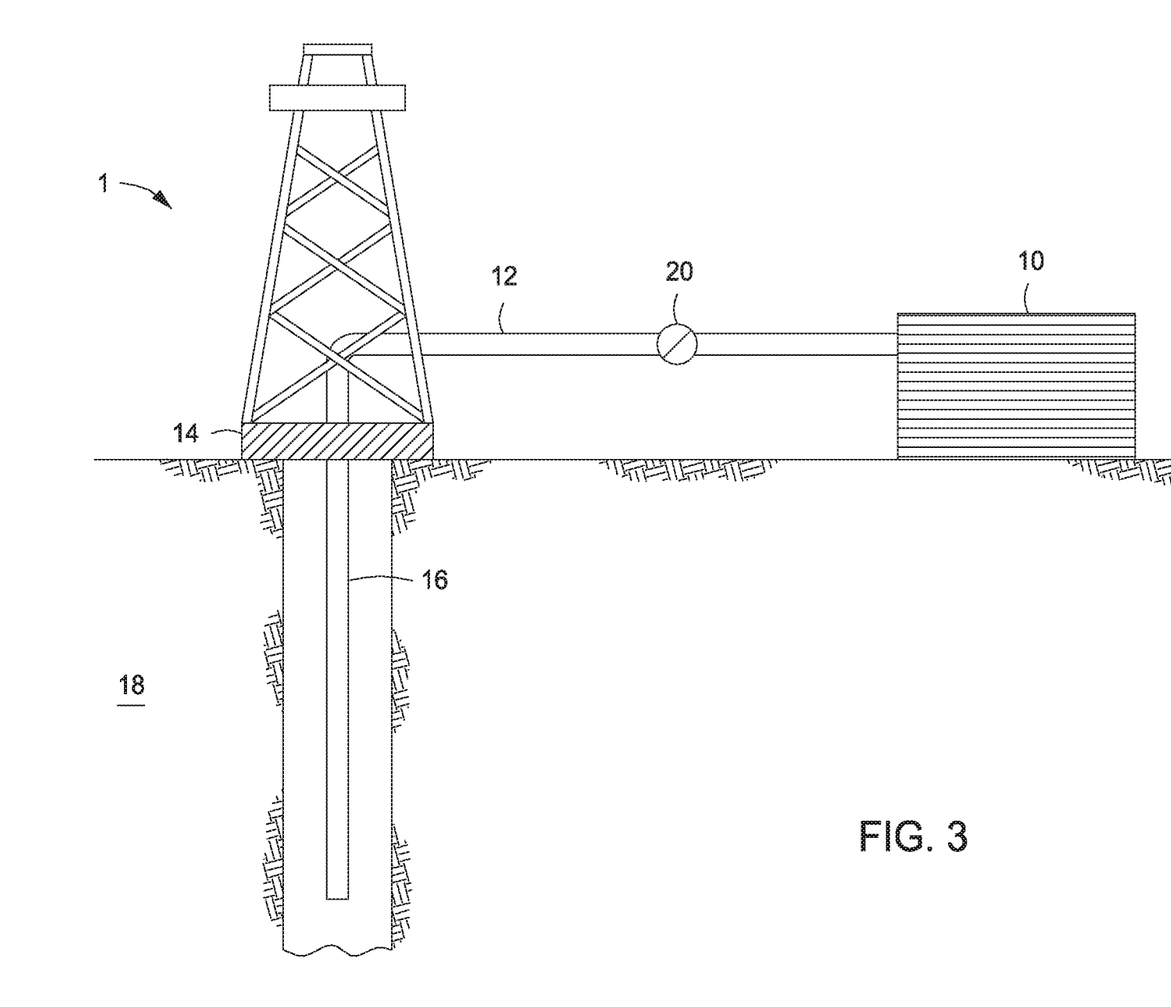
FIG. 3 depicts an embodiment of a system configured for delivering various treatment fluids of the embodiments described herein to a downhole location, according to one or more embodiments of the present disclosure.

FIG. 3 shows an illustrative schematic of a system that can deliver the treatment fluids of the present disclosure to a downhole location, according to one or more embodiments. It should be noted that while FIG. 3 generally depicts a land-based system, it is to be recognized that like systems may be operated in subsea locations as well. As depicted in FIG. 3, system 1 may include mixing tank 10, in which the fluids of the embodiments herein may be formulated. The fluids may be conveyed via line 12 to wellhead 14, where the fluids enter tubular 16, tubular 16 extending from wellhead 14 into subterranean formation 18. Upon being ejected from tubular 16, the fluids may subsequently penetrate into subterranean formation 18. Pump 20 may be configured to raise the pressure of the fluids to a desired degree before introduction into tubular 16. It is to be recognized that system 1 is merely exemplary in nature and various additional components may be present that have not necessarily been depicted in FIG. 3 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 3, the fluid or a portion thereof (e.g., the broken fluid) may, in some embodiments, flow back to wellhead 14 and exit subterranean formation 18. In some embodiments, the fluid that has flowed back to wellhead 14 may subsequently be recovered and recirculated to subterranean formation 18, or otherwise treated for use in a subsequent subterranean operation or for use in another industry.

It is also to be recognized that the disclosed fluids may also directly or indirectly affect the various downhole equipment and tools that may come into contact with the fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 3.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include:

Embodiment A

A method comprising: (a) isolating a first treatment interval comprising at least one first opening through a wellbore and into a subterranean formation; (b) introducing a high efficiency treatment fluid into the subterranean formation through the first opening at a pressure above a fracture gradient of the subterranean formation to create or enhance at least one dominant fracture therein; (c) introducing a ultra-low-viscosity treatment fluid into the subterranean formation through the first opening at a pressure above the fracture gradient to create or enhance at least one first branch fracture wherein the ultra-low viscosity treatment fluid comprises a liquid gas and first micro-proppant, and wherein the liquid gas is selected from the group consisting of liquid carbon dioxide, a liquid gas hydrocarbon, a natural gas liquid, and any combination thereof; (d) placing at least a portion of the first micro-proppant into the at least one first branch fracture; (e) introducing a proppant treatment fluid into the subterranean formation through the first opening, wherein metered into the proppant treatment fluid over time are proppant particulates gradually increasing in unit mesh size; and (f) placing at least a portion of the metered proppant particulates into the at least one dominant fracture.

Embodiment A may have one or more of the following additional elements in any combination:

Element A1: Wherein the liquid gas in the ultra-low viscosity treatment fluid is liquid carbon dioxide.

Element A2: Wherein a treatment fluid selected from the group consisting of the high efficiency treatment fluid, the proppant treatment fluid, and any combination thereof comprises a foamed liquid gas selected from the group consisting of a foamed liquid carbon dioxide, a foamed liquid gas hydrocarbon, a foamed natural gas liquid, and any combination thereof.

Element A3: Wherein the high efficiency fracturing treatment fluid comprises a nitrogen gas borate crosslinked fluid; a foamed liquid carbon dioxide non-borate crosslinked fluid; a binary foamed non-borate crosslinked fluid comprising both liquid carbon dioxide and gas nitrogen, where greater than 50% of the combined liquid $CO_2$ and gas $N_2$ is liquid $CO_2$; and any combination thereof.

Element A4: Wherein the ultra-low-viscosity fracturing treatment fluid further comprises nanoparticulates.

Element A5: Wherein a treatment fluid selected from the group consisting of the high efficiency fracturing treatment fluid, the proppant treatment fluid, and any combination thereof further comprises micro-proppant.

Element A6: Wherein the subterranean formation is a low-permeability or an ultra-low permeability formation.

Element A7: Further comprising repeating (b) through (f).

Element A8: Further comprising repeating (a) through (f) at at least a second treatment interval through at least a second opening.

Element A9: Further comprising a tubular extending into the subterranean formation and a pump fluidly coupled to the tubular, the tubular containing a fluid selected from the group consisting of the high efficiency treatment fluid, the ultra-low viscosity treatment fluid, the proppant treatment fluid, and any combination thereof.

By way of non-limiting example, exemplary combinations applicable to A include: A1-A9; A1, A4, and A7; A2 and A8; A3, A4, A6, and A9; A7 and A8; A2, A3, and A6; and any combination of one or more of A1-A9 in any non-limiting combination.

Embodiment B

A method comprising: (a) isolating a first treatment interval comprising at least one first opening through a wellbore and into a subterranean formation; (b) introducing a high efficiency treatment fluid into the subterranean formation through the first opening at a pressure above a fracture gradient of the subterranean formation to create or enhance at least one dominant fracture therein; (c) introducing an ultra-low viscosity treatment fluid into the subterranean formation through the first opening at a pressure above the fracture gradient to create or enhance at least one first secondary branch fracture, wherein the ultra-low viscosity treatment fluid comprises a liquid gas and first micro-proppant, and wherein the liquid gas is selected from the group consisting of liquid carbon dioxide, a liquid gas hydrocarbon, a natural gas liquid, and any combination thereof; (d) placing at least a portion of the first micro-proppant into the at least one first branch fracture; (e) introducing a diverting treatment fluid into the subterranean formation through the first opening, wherein the diverting treatment fluid comprises a base fluid and degradable diverting agent; (f) introducing a proppant treatment fluid into the subterranean formation through the first opening, wherein metered into the proppant treatment fluid over time are proppant particulates gradually increasing in unit mesh size; (g) placing at least a portion of the metered proppant particulates into the at least one dominant fracture; and (h) creating or enhancing at least one branch fracture selected from the group consisting of a second secondary fracture, a tertiary branch fracture, and any combination thereof.

Embodiment B may have one or more of the following additional elements in any combination:

Element B1: Wherein the liquid gas in the ultra-low viscosity treatment fluid is liquid carbon dioxide.

Element B2: Wherein a treatment fluid selected from the group consisting of the high efficiency treatment fluid, the proppant treatment fluid, the diverting treatment fluid, and any combination thereof comprises a foamed liquefied gas selected from the group consisting of a foamed liquid carbon dioxide, a foamed liquid gas hydrocarbon, a foamed natural gas liquid, and any combination thereof.

Element B3: Wherein the high efficiency treatment fluid comprises a nitrogen gas borate crosslinked fluid; a foamed liquid carbon dioxide non-borate crosslinked fluid; a binary foamed non-borate crosslinked fluid comprising both liquid carbon dioxide and gas nitrogen, where greater than 50% of the combined liquid $CO_2$ and gas $N_2$ is liquid $CO_2$; and any combination thereof.

Element B4: Wherein the ultra-low viscosity treatment fluid further comprises nanoparticulates.

Element B5: Wherein a treatment fluid selected from the group consisting of the high efficiency treatment fluid, the proppant treatment fluid, the diverting treatment fluid, and any combination thereof further comprises micro-proppant.

Element B6: Wherein the subterranean formation is a low-permeability or an ultra-low permeability formation.

Element B7: Further comprising repeating (b) through (h).

Element B8: Further comprising repeating (a) through (h) at at least a second treatment interval through at least a second opening.

Element B9: Further comprising a tubular extending into the subterranean formation and a pump fluidly coupled to the tubular, the tubular containing a fluid selected from the group consisting of the high efficiency treatment fluid, the ultra-low viscosity treatment fluid, the proppant treatment fluid, the diverting treatment fluid, and any combination thereof.

By way of non-limiting example, exemplary combinations applicable to B include: B1-B9; B6 and B9; B2, B3, and B5; B1 and B3; B6, B7, and B8; B4 and B6; B2, B4, and B6; and any combination of one or more of B1-B9 in any non-limiting combination.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
   (a) isolating a first treatment interval comprising at least one first opening through a wellbore and into a subterranean formation;
   (b) then introducing a high efficiency treatment fluid into the subterranean formation through the first opening at a pressure above a fracture gradient of the subterranean formation to create or enhance at least one dominant fracture therein; wherein the high efficiency treatment fluid has a viscosity in a range greater than about 6 centipoise (cP) to about 5000 cP and a leakoff propensity of less than about 30% by volume of the liquid portion of the high efficiency treatment fluid;
   (c) then introducing an ultra-low-viscosity treatment fluid into the subterranean formation through the first opening at a pressure above the fracture gradient to create or enhance at least one first branch fracture wherein the ultra-low viscosity treatment fluid comprises a liquid gas and first micro-proppant having a size in a range of about 0.1 μm to about 100 μm, and wherein the liquid gas is a liquid gas hydrocarbon; wherein the ultra-low viscosity treatment fluid has a viscosity in a range of about 0.1 cP to about 1 cP;
   (d) then placing at least a portion of the first micro-proppant into the at least one first branch fracture;
   (e) then introducing a proppant treatment fluid into the subterranean formation through the first opening, wherein metered into the proppant treatment fluid over time are proppant particulates gradually increasing in unit mesh size; and
   (f) then placing at least a portion of the metered proppant particulates into the at least one dominant fracture.

2. The method of claim 1, wherein at least one of the high efficiency treatment fluid or the proppant treatment fluid comprises a foamed liquid gas selected from the group consisting of a foamed liquid carbon dioxide, a foamed liquid gas hydrocarbon, a foamed natural gas liquid, and any combination thereof.

3. The method of claim 1, wherein the high efficiency treatment fluid comprises a fluid selected from the group consisting of a nitrogen gas borate crosslinked fluid; a foamed liquid carbon dioxide non-borate crosslinked fluid; a binary foamed non-borate crosslinked fluid that comprises both liquid carbon dioxide ($CO_2$) and gas nitrogen ($N_2$) and greater than 50% of the combined liquid $CO_2$ and gas $N_2$ is liquid $CO_2$; and any combination thereof.

4. The method of claim 1, wherein the ultra-low viscosity treatment fluid further comprises nanoparticulates.

5. The method of claim 1, wherein at least one of the high efficiency treatment fluid or the proppant treatment fluid comprises micro-proppant.

6. The method of claim 1, wherein the subterranean formation has a permeability of less than about 1 millidarcy.

7. The method of claim 1, further comprising repeating (b) through (f).

8. The method of claim 1, further comprising repeating (a) through (f) at at least a second treatment interval through at least a second opening.

9. The method of claim 1, further comprising a tubular extending into the subterranean formation and a pump fluidly coupled to the tubular, the tubular containing at least one of the high efficiency treatment fluid, the ultra-low viscosity treatment fluid or the proppant treatment fluid.

10. The method of claim 1, wherein the liquid gas hydrocarbon comprises a hydrocarbon selected from the group consisting of methane, ethane, propane, butane, isobutene, pentane, and any combination thereof.

11. A method comprising:
(a) isolating a first treatment interval comprising at least one first opening through a wellbore and into a subterranean formation;
(b) then introducing a high efficiency treatment fluid into the subterranean formation through the first opening at a pressure above a fracture gradient of the subterranean formation to create or enhance at least one dominant fracture therein; wherein the high efficiency treatment fluid has a viscosity in a range greater than about 6 centipoise (cP) to about 5000 cP and a leakoff propensity of less than about 30% by volume of the liquid portion of the high efficiency treatment fluid;
(c) then introducing an ultra-low viscosity treatment fluid into the subterranean formation through the first opening at a pressure above the fracture gradient to create or enhance at least one first secondary branch fracture, wherein the ultra-low viscosity treatment fluid comprises a liquid gas and first micro-proppant having a size in a range of about 0.1 pm to about 100 pm, and wherein the liquid gas is a liquid gas hydrocarbon; wherein the ultra-low viscosity treatment fluid has a viscosity in a range of about 0.1 cP to about 1 cP;
(d) then placing at least a portion of the first micro-proppant into the at least one first branch fracture;
(e) then introducing a diverting treatment fluid into the subterranean formation through the first opening, wherein the diverting treatment fluid comprises a base fluid and degradable diverting agent;
(f) then introducing a proppant treatment fluid into the subterranean formation through the first opening, wherein metered into the proppant treatment fluid over time are proppant particulates gradually increasing in unit mesh size;
(g) then placing at least a portion of the metered proppant particulates into the at least one dominant fracture; and
(h) then creating or enhancing at least one branch fracture selected from the group consisting of a second secondary fracture, a tertiary branch fracture, and any combination thereof.

12. The method of claim 11, wherein at least one of the high efficiency treatment fluid, the proppant treatment fluid, or the diverting treatment fluid comprises a foamed liquefied gas selected from the group consisting of a foamed liquid carbon dioxide, a foamed liquid gas hydrocarbon, a foamed natural gas liquid, and any combination thereof.

13. The method of claim 11, wherein the high efficiency treatment fluid comprises a fluid selected from the group consisting of a nitrogen gas borate crosslinked fluid; a foamed liquid carbon dioxide non-borate crosslinked fluid; a binary foamed non-borate crosslinked fluid that comprises both liquid carbon dioxide ($CO_2$) and gas nitrogen ($N_2$) and greater than 50% of the combined liquid $CO_2$ and gas $N_2$ is liquid $CO_2$; and any combination thereof.

14. The method of claim 11, wherein the ultra-low viscosity treatment fluid further comprises nanoparticulates.

15. The method of claim 11, wherein at least one of the high efficiency treatment fluid, the proppant treatment fluid, or the diverting treatment fluid further comprises micro-proppant.

16. The method of claim 11, wherein the subterranean formation has a permeability of less than about 1 millidarcy.

17. The method of claim 11, further comprising repeating (b) through (h).

18. The method of claim 11, further comprising repeating (a) through (h) at at least a second treatment interval through at least a second opening.

19. The method of claim 11, further comprising a tubular extending into the subterranean formation and a pump fluidly coupled to the tubular, the tubular containing at least one of the high efficiency treatment fluid, the ultra-low viscosity treatment fluid, the proppant treatment fluid, or the diverting treatment fluid.

20. The method of claim 11, wherein the liquid gas hydrocarbon comprises a hydrocarbon selected from the group consisting of methane, ethane, propane, butane, isobutene, pentane, and any combination thereof.

* * * * *